United States Patent Office 3,396,908
Patented Aug. 13, 1968

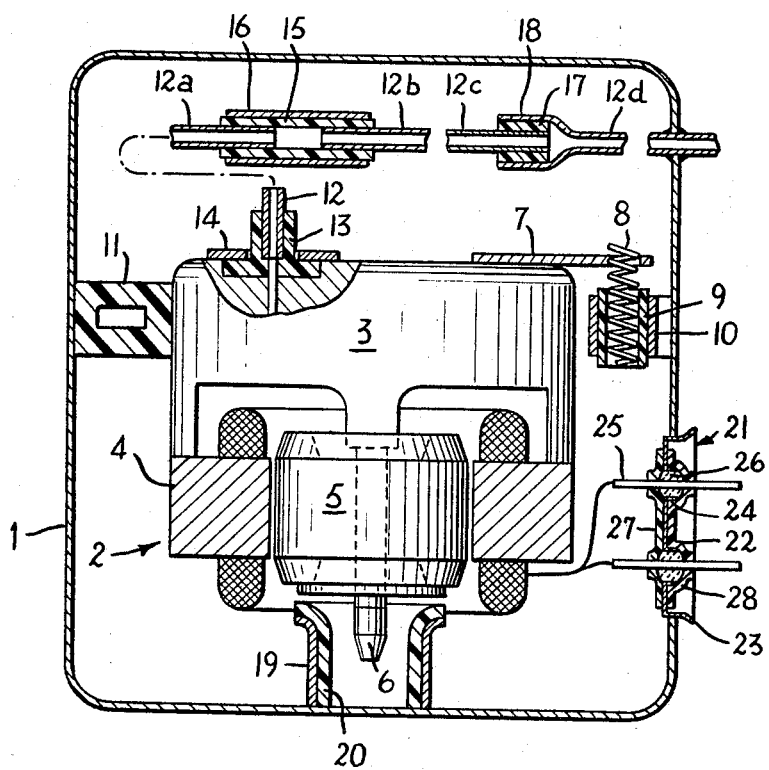

3,396,908
HERMETICALLY SEALED COOLING MACHINE
Holger V. Vind, Nordborg, Denmark, assignor to Danfoss A/S, Nordborg, Denmark, a company of Denmark
Filed June 22, 1966, Ser. No. 559,550
Claims priority, application Germany, June 23, 1965, D 47,572
5 Claims. (Cl. 230—235)

ABSTRACT OF THE DISCLOSURE

A hermetically sealed capsule encloses a resiliently mounted motor compressor unit. The conduits of the compressor and the resilient suspension means of the unit as as well as the electrical circuit are electrically insulated from the capsule.

---

This invention relates generally to hermetically sealed cooling apparatus and more particularly to hermetically sealed cooling apparatus in which a motor compressor unit is elastically or oscillatably mounted in a hermetically sealed capsule.

Hermetically sealed cooling machines or apparatus are mainly used in household refrigerators, air-conditioning equipment and electro-medical apparatus. Thus the user or operator of the apparatus may come into physical contact with the capsule of such hermetically enclosed or sealed unit. Protection is provided to the user or operator in the known devices by grounding the hermetic capsule. However, during production or installation the grounding lead is sometimes forgotten or may be placed inadequately thereon so that the electrical motor compressor and capsule are not properly grounded and the apparatus is actually potentially unsafe to the user or operator.

A principal object of the present invention is to provide a hermetically sealed cooling machine or apparatus in which the refrigerating unit therein is electrically isolated from the hermetic capsule and can be used without need of electrical grounding.

A feature of the invention is the provision of electrical insulation means electrically isolating the motor compressor within the capsule or from the capsule even though physical connection is made with the capsule. The apparatus, according to the invention, provides electrical insulation means electrically isolating the conduits, which provide a flow path for the refrigerant from the compressor to the cooling system externally of the capsule, and electrical isolation for the suspension means within the capsule as well as the internal electrical circuit comprising the conductors connecting the electrical motor of the motor compressor to the power source outside of the capsule.

The use of electrical isolation means completely isolates the inner components of the refrigeration unit from the capsule or precludes exposing the unit to development of a voltage differential between the compressor unit and the capsule. Any possible electrical flow path between the motor compressor unit and the capsule is interrupted by the use of insulation means or electrically isolated so that the electrical current paths to the capsule and flow of current to the capsule is completely avoided as well as avoiding the possibility of a voltage differential that could shock a user.

Other features and advantages of the cooling apparatus in accordance with the present invention will be better understood as described in the following specification and appended claims in conjunction with the drawing, which is a sectional view of a hermetically sealed capsule with a refrigerating unit therein illustrated partly in section.

Apparatus according to the invention comprises a hermetic capsule 1. Within the capsule is suspended a refrigerating unit 2 comprising a refrigerant compressor 3 driven by an electric motor having a stator 4 and a rotor 5 for driving a shaft 6 connected to drive the compressor 3 illustrated diagramatically.

The refrigerating unit 2 is suspended internally of the capsule 1 by an arm 7 which is resiliently held by a compression spring 8, functioning as a suspension spring, held in a socket 9 made of electically insulative material and held in a fixed bracket 10 that is secured to the capsule 1. The resilient mount permits oscillation to a degree of the refrigerating unit principally in a direction parallel to the axis of the spring 8. A resilient pad or cushion 11 holds the refrigerating unit 2 likewise in suspension jointly with the other resilient means. The pad 11 is bonded or otherwise secured to the compressor unit 3 and to the inner wall of the casing or capsule and will allow some movement in a direction normal to the principal oscillation direction heretofore described.

The usual flow path of refrigerant to a system, not shown, externally of the capsule is provided in these devices such that the flow path for the refrigerant may function as a flow path for electrical currents to the capsule that could shock the operator or user. Some known cooling machines use plastic flexible refrigerant conduits in suspended hermetically sealed refrigeration apparatus. This kind of construction will avoid undesired electrical flow paths through such conduits but this requires special plastic hose or the like. In the present invention provision is made to avoid all electrical flow path between the refrigerating unit and the capsule. Conduit means are provided in a new arrangement, for supplying refrigerant from the compressor to externally of the apparatus and back to the compressor.

For ease of understanding the drawing illustrates the high pressure conduit means only, of the refrigerant circuit, and it can be seen that this conduit or pipe 12 may be divided into a plurality of pipe portions which are electrically isolated from each other so that the electrical flow path through the conduit means is interrupted. As shown in the drawing a conduit portion 12 is held in an electrically insulating socket 13 having a flange as illustrated and held in the compressor by a ring 14. By isolating at the point of juncture between the conduit means and the compressor the electrical flow path is avoided.

The conduit means providing a flow path for the refrigerant from the compressor to externally of the capsule may likewise be interrupted in different ways: The high pressure pipe 12 may be made of portions 12a and 12b spaced longitudinally from each other and enclosed by an insulating sleeve 15 held in an outer sleeve 16 so that the two are actually in communication with each other for the refrigerant that are electrically isolated from each other. It can be seen that the high portion 12b can lead directly outwardly of the capsule and the possibility of any electrical flow path is avoided. Moreover, the conduit means can consist of a pipe which extends from the compressor and of which a portion 12c is connected to a pipe portion 12d which would extend outwardly of the capsule. The pipe portion 12c is received in a non-conductive sleeve 17 which is enclosed in a socket 18 joined to the pipe part or portion 12d.

While the conduit means illustrated, which is conductive, is that of the high pressure line from the compressor to externally of the capsule it can be seen that the return line, not shown, may be likewise similarly constructed to avoid short circuits, etc. The return line is obviously not illustrated in the view of the apparatus illustrated but is similarly constructed and has a similar "loop" to allow flexure upon movement of the compressor. Moreover, it can be seen that any of the three methods described for interrupting the conduit means and providing electrical insulation between the conduit means and the compressor and the capsule will suffice. The three possible techniques are illustrated in a single drawing but are usable singly as desired and each is completely effective.

The refrigeration unit 2 being oscillatably mounted within the capsule 21 may require provision of a bumper 19 having an insulation internal contact piece 20 configured similarly to the bumper 19. So that in the event that the refrigeration unit oscillates, even though the cushion 11 damps oscillations, parallel to the shaft sufficiently to make contact with the bumper the formation of an electrical path or circuit to the capsule is completely avoided by the insulation contact piece 20.

The capsule is provided with the usual junction or terminal box 21 comprising a middle plate 22 having beveled edge 23 and openings 24 formed cylindrically and through which extend electrical conductors 25 extending through non-conductive glass seals 26 internally of the cylindrical openings 24 formed in the plate 22. The conductors 25 provide a male connector for connecting the motor to an external power source, not shown. Two non-conductive layers 27, 28 of epoxy resin seal the openings through the plate 22 and seal in plate 22 and likewise seal in the glass seal 26 providing a complete electrical isolation of the conductors from the capsule.

It can thus be seen that the invention provides for complete electrical isolation of the internal components of the apparatus from the capsule so that in the event that one chooses the use of electrical grounding of the capsule is unnecessary but may be used and if improperly or otherwise inadequately made the unit remains safe. Moreover, those skilled in the art will understand that the space or distance between the motor compressor and the inner walls of the capsule is sufficient to preclude shocking a user or operator due to potential difference between the motor compressor and the capsule.

While preferred embodiments of the invention have been shown and described it will be understood that many modifications and changes can be made within the true spirit and scope of the invention.

What I claim and desire to secure by Letters Patent is:

1. In a hermetically enclosed cooling apparatus, a hermetically sealed capsule, a refrigerating unit comprising a refrigerant compressor and an electric motor connected to said compressor for driving said compressor disposed internally of said capsule, resilient means resiliently supporting said compressor and said motor in said capsule spaced therefrom, support means secured to said capsule internally thereof supporting said resilient means and said motor and compressor, first electrical insulation means electrically isolating said resilient means from said support means, conduit means for supplying refrigerant from said compressor externally of said capsule to a system and for returning refrigerant to said compressor internally of said capsule, second electrical insulation means electrically isolating said conduit means from said compressor thereby to electrically isolate said motor and said compressor from said capsule, electrical conductors connected to said motor extending to said capsule for making electrical connection to said motor from externally of said capsule, third electrical insulation means on said capsule electrically isolating said conductors from said capsule, said conductors extending at least through said third electrical insulation means, said resilient means comprising a compression spring, means connecting said spring to said compressor, said support means comprising a bracket having a socket supporting said spring, and said first electrical insulation means comprising electrical insulation isolating the spring electrically from said bracket.

2. In a hermetrically enclosed cooling apparatus, a hermetically sealed capsule, a refrigerating unit comprising a refrigerant compressor and an electric motor connected to said compressor for driving said compressor disposed internally of said capsule, resilient means resiliently supporting said compressor and said motor in said capsule spaced therefrom, support means secured to said capsule internally thereof supporting said resilient means and said motor and compressor, first electrical insulation means electrically isolating said resilient means from said support means, conduit means for supplying refrigerant from said compressor externally of said capsule to a system and for returning refrigerant to said compressor internally of said capsule, second electrical insulation means electrically isolating said conduit means from said compressor thereby to electrically isolate said motor and said compressor from said capsule, electrical conductors connected to said motor extending to said capsule for making electrical connection to said motor from externally of said capsule, third electrical insulation means on said capsule electrically isolating said conductors from said capsule, said conductors extending at least through said third electrical insulation means, said conduit means comprising longitudinally spaced, electrically conductive pipe portions, said portion providing communication with said compressor and communication exteriorly of said capsule, and said second electrical insulation means comprising electrical insulated sleeve means joining said spaced pipe portions providing communication therebetween.

3. In a hermetically enclosed cooling apparatus, a hermetically sealed capsule, a refrigerating unit comprising a refrigerant compressor and an electric motor connected to said compressor for driving said compressor disposed internally of said capsule, resilient means resiliently supporting said compressor and said motor in said capsule spaced therefrom, support means secured to said capsule internally thereof supporting said resilient means and said motor and compressor, first electrical insulation means electrically isolating said resilient means from said support means, conduit means for supplying refrigerant from said compressor externally of said capsule to a system and for returning refrigerant to said compressor internally of said capsule, second electrical insulation means electrically isolating said conduit means from said compressor thereby to electrically isolate said motor and said compressor from said capsule, electrical conductors connected to said motor extending to said capsule for making electrical connection to said motor from externally of said capsule, third electrical insulation means on said capsule electrically isolating said conductors from said capsule, said conductors extending at least through said third electrical insulation means, said third electrical insulation means comprising glass seals through which said conductors extend, and electrically insulative means mounting said seals on said capsule in a sealed condition relative to said capsule.

4. In a hermetically enclosed cooling apparatus according to claim 3, in which said electrically insulative means comprises epoxy resin layers inside and outside of said capsule between which glass seals are sealed.

5. In a hermetically enclosed cooling apparatus, a hermetically sealed capsule, a refrigerating unit comprising a refrigerant compressor and an electric motor connected to said compressor for driving said compressor disposed internally of said capsule, resilient means resiliently supporting said compressor and said motor in said capsule spaced therefrom, support means secured to said capsule internally thereof supporting said resilient means and said motor and compressor, first electrical insulation means electrically isolating said resilient means from said support means, conduit means for supplying refrigerant from said compressor externally of said capsule to a system and for returning refrigerant to said compressor internally of said capsule, second electrical insulation means electrically isolating said conduit means from said compressor thereby to electrically isolate said motor and said compressor from said capsule, electrical conductors connected to said motor extending to said capsule for making electrical connection to said motor from externally of said capsule, third electrical insulation means on said capsule electrically isolating said conductors from said capsule, said conductors extending at least through said third electrical insulation means, said conduit means comprising longitudinally spaced, electrically conductive pipe portions, and said second insulation means comprising an electrically insulated socket on one pipe portion receiving another of said portions providing communication between said spaced pipe portions.

References Cited

UNITED STATES PATENTS

| | | | |
|---|---|---|---|
| 2,365,673 | 12/1944 | Benson | 230—58 |
| 3,250,461 | 5/1966 | Parker | 230—58 |

FOREIGN PATENTS

| | | |
|---|---|---|
| 852,895 | 11/1960 | Great Britain. |

ROBERT M. WALKER, *Primary Examiner.*